United States Patent
Fujiwara et al.

[11] Patent Number: 5,306,369
[45] Date of Patent: Apr. 26, 1994

[54] PROCESS OF BONDING AROMATIC POLYAMIDE FIBERS TO RUBBER COMPOUNDS

[75] Inventors: Akinori Fujiwara; Katsuhiko Hata, both of Kobe, Japan

[73] Assignee: Bando Chemical Industries, Ltd., Japan

[21] Appl. No.: 911,377

[22] Filed: Jul. 13, 1992

Related U.S. Application Data

[63] Continuation of Ser. No. 456,636, Dec. 22, 1989, abandoned.

[30] Foreign Application Priority Data

Dec. 23, 1988 [JP] Japan .................. 63-327234
Dec. 23, 1988 [JP] Japan .................. 63-327235

[51] Int. Cl.$^5$ .......................... B29C 34/02; C09J 5/04; C09J 109/10
[52] U.S. Cl. .................. 156/110.1; 152/565; 156/315; 156/333; 156/910
[58] Field of Search .............. 152/565; 156/315, 333, 156/910, 110.1; 428/378, 395

[56] References Cited

U.S. PATENT DOCUMENTS

| | | | |
|---|---|---|---|
| 3,190,764 | 6/1965 | Cardina | 156/330 X |
| 3,577,310 | 5/1971 | Torti et al. | 156/333 X |
| 3,803,035 | 4/1974 | Bhakuni et al. | 156/910 X |
| 4,048,362 | 9/1977 | Moring et al. | 152/565 X |
| 4,448,813 | 5/1984 | Solomon | 156/910 X |
| 4,933,236 | 6/1990 | Anderson et al. | 156/910 X |
| 5,032,454 | 7/1991 | Oyama et al. | 156/333 X |
| 5,080,159 | 1/1992 | Komai et al. | 152/565 X |
| 5,118,545 | 6/1992 | Burlett et al. | 156/910 X |
| 5,151,142 | 9/1992 | Imai et al. | 156/910 X |

OTHER PUBLICATIONS

*Mechanics of Pneumatic Tires*, ed. Samuel Clark: U.S. Dept. of Transportation, Aug. 1981, pp. 86-897, 107.

Primary Examiner—Michael W. Ball
Assistant Examiner—Adrienne C. Johnstone
Attorney, Agent, or Firm—Wegner, Cantor, Mueller & Player

[57] ABSTRACT

A process of bonding aromatic polyamide fibers to rubber compounds is disclosed, which comprises:

the first step of treating fibers with an aqueous mixture comprising a resorcinol/formalin resin and a latex of a polymer containing halogens in amounts of not less than 45% by weight based on the polymer;

the second step of treating the fibers with an aqueous adhesive composition comprising a resorcinol/formalin resin and a latex of an adhesive rubber which is compatible with the rubber in the rubber compound; and the third step of placing the fibers in close contact with the rubber compound and vulcanizing the rubber together with the fibers.

A second process is further disclosed wherein in the second step, the fibers are treated with an adhesive solution comprising at least one activating agent selected from the group consisting of polyisocyanates and polyepoxy compounds in organic solvents.

4 Claims, 6 Drawing Sheets

PROCESS OF BONDING AROMATIC POLYAMIDE FIBERS TO RUBBER COMPOUNDS

This application is a continuation of U.S. application Ser. No. 07/456,636 filed Dec. 22, 1989 now abandoned.

This invention relates to a method of bonding aromatic polyamide fibers to rubber compounds.

Industrial rubber products such as automobile tires, rubber hoses, power transmission belts and conveyor belts are normally reinforced with fiber materials. Synthetic fibers are widely used as such reinforcing fiber materials since they are in general superior to natural fibers such as cotton, wool or hemp in properties such as strength, modulus of elasticity, resistance to friction and dimensional stability when being exposed to water or heat. In recent years, polyamide fibers including aliphatic polyamide fibers and aromatic polyamide fibers and polyester fibers are especially preferred as reinforcements among a variety of synthetic fibers.

Meanwhile, a variety of methods of bonding fibers to rubber compounds or mixes are known, among which there is a well known method wherein fibers are treated with so-called RFL solutions, namely aqueous mixtures of resorcinol/formalin resins and rubber latices, and placed in contact with rubber compounds, and then the rubber compounds are vulcanized together with the fibers. Resorting to this method, adhesion is attained to a degree between synthetic fibers and rubber compounds. However, adhesion between synthetic fibers and rubber compounds is an important factor to determine the properties of the industrial rubber products. In this regard, since synthetic fibers are poorly wettable to RFL solutions, the adhesion attained is still unsatisfactory.

Therefore, a number of methods have heretofore been proposed wherein a variety of modified RFL solutions are employed to improve adhesion between synthetic fibers and rubber compounds. For instance, a method is disclosed in Japanese Patent Laid-open No. 49-96048 in which an RFL solution is used which contains a chlorohydrin rubber latex and a chloroprene rubber latex together with resorcinol/formalin resin for bonding polyamide fibers to chloroprene rubber mixes.

A further method is also disclosed in Japanese Patent Laid-open No. 59-89375 wherein an RFL solution is used which is composed of aqueous mixture of a chloroprene/dichlorobutadiene copolymer latex and resorcinol/formalin resin.

On the other side, high saturation or complete saturation rubbers such as high saturation nitrile rubber, ethylene/propylene rubber, chlorinated polyethylene, chlorosulfonated polyethylene, epichlorohydrin rubber or fluorocarbon rubber have come to be used increasingly in various industrial fields in recent years. These rubbers are more poorly bonded to synthetic fibers.

Thus, a still further method has been proposed, as disclosed in Japanese Patent Laid-open No. 61-207442, to bond high saturation hydrocarbon rubbers such as hydrogenated nitrile rubbers to fibers wherein an RFL solution is employed which is composed of aqueous mixtures of halogen containing polymers such as epichlorohydrin rubber, chloroprene rubber, chlorosulfonated polyethylene rubber or chlorinated polyethylene rubber, together with resorcinol/formalin resin.

However, aromatic polyamide fibers are very poorly wettable to RFL solutions due to their more inactive surface than those of aliphatic polyamide fibers or polyester fibers. Accordingly, when vulcanized composite products of aromatic polyamide fibers and rubbers produced by such known methods as above do not stand uses where large shearing force is generated between the rubber and fibers by, for example, bending, compression or elongation under high temperature conditions, since the adhesion therebetween is insufficient to lead to separation failure at interface between the fibers and rubbers. Thus, the composite products are of short life and fail to make the best use of excellent properties that the aromatic polyamide fibers possess.

It is, therefore, an object of the invention to obviate the problems involved in the prior art adhesion of aromatic polyamide fibers to rubber compounds, and to provide a process to attain strong and durable adhesion between aromatic polyamide fibers and rubbers.

A first process of the invention of bonding aromatic polyamide fibers to rubber compounds comprises:

the first step of treating fibers with an aqueous mixture comprising a resorcinol/formalin resin and a latex of a polymer containing halogens in amounts of not less than 45% by weight based on the polymer;

the second step of treating the fibers with an aqueous adhesive composition comprising a resorcinol/formalin resin and a latex of an adhesive rubber which is compatible with the rubber in the rubber compound; and the third step of placing the fibers in close contact with the rubber compound and vulcanizing the rubber together with the fibers.

A process is provided for bonding aromatic polyamide fibers to rubber compounds which comprises:

a first step of treating fibers with an aqueous mixture consistent essentially of a resorcinol/formalin resin and a latex of a polymer selected from the group consistent of polyvinyl chloride, chlorinated rubber, chlorinated polyethylene, poly(dichlorobutadiene) and a copolymer of dichlorobutadiene and containing chlorine in amounts of not less than 45% by weight based on the polymer; the polymer being contained in the aqueous mixture in amounts of 50–1000 parts by weight in relation to 100 parts by weight of the resorcinol/formalin resin;

a second step of treating the fibers with an aqueous adhesive composition consisting essentially of a resorcinol/formalin resin and a latex of an adhesive rubber which is compatible with the rubber in the rubber compounds; the adhesive rubber being contained in the aqueous adhesive composition in amounts of 50–1000 parts by weight in relation to 100 parts by weight of the resorcinol/formalin resin;

a third step of placing the fibers in close contact with rubber compound and then vulcanizing the rubber together with the fibers wherein the adhesive rubber has a solubility parameter in the range of from the solubility parameter of the rubber in the rubber compound plus one to the solubility parameter of the rubber in the rubber compound minus one in accordance with the formula $$\delta = \Sigma F/V$$

wherein
F is the molar attraction and
V is (as before) the molar volume.

In accordance with the invention, there is provided a second process of bonding aromatic polyamide fibers to rubber compounds, which comprises:

the first step of treating fibers with an aqueous mixture comprising a resorcinol/formalin resin and a latex of a polymer containing halogens in amounts of not less than 45% by weight based on the polymer;

the second step of treating the fibers with an adhesive composition comprising at least one activating agent selected from the group consisting of a polyisocyanate compound and an epoxy compound in amounts of 10-90 parts by weight and an adhesive rubber which is compatible with the rubber in the rubber compound in amounts of 90-10 parts by weight; and the third step of placing the fibers in close contact with the rubber compound and vulcanizing the rubber together with the fibers.

Figure 5:
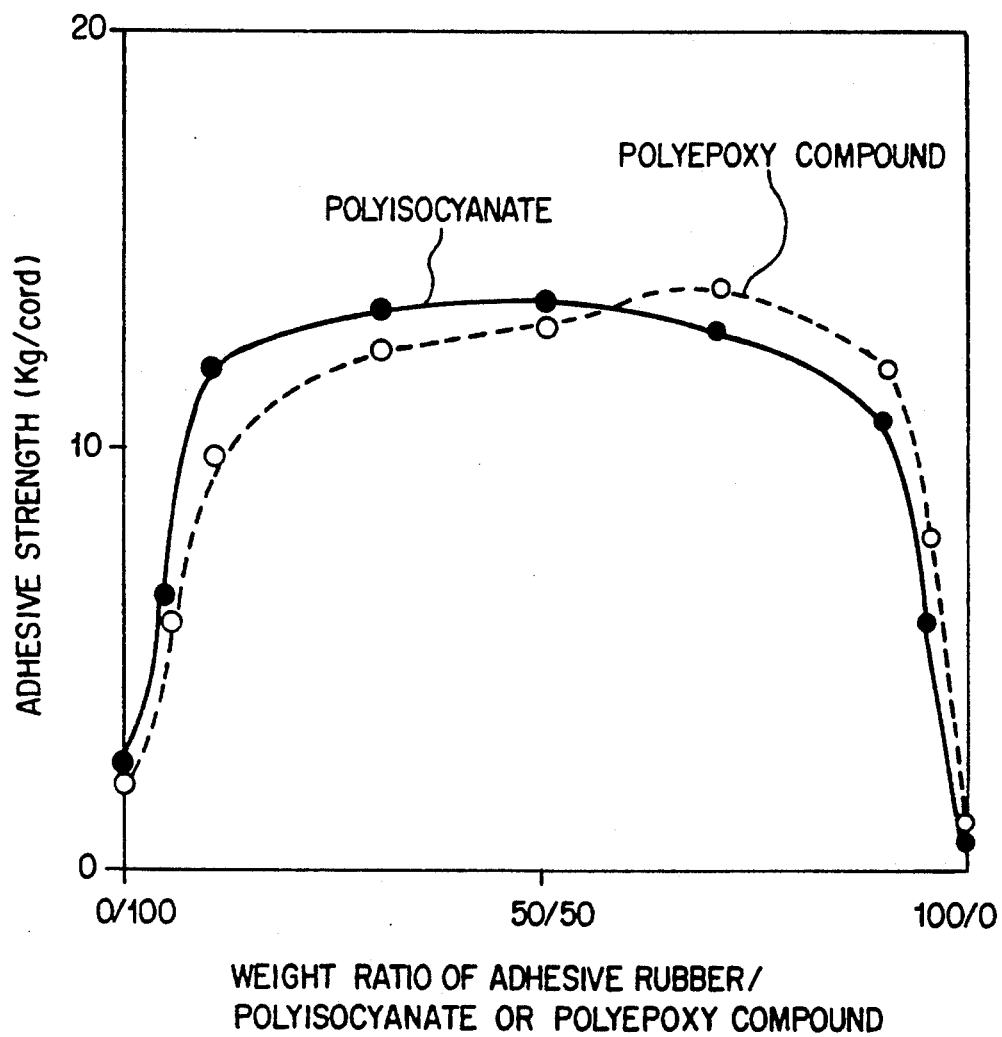
Figure 6:
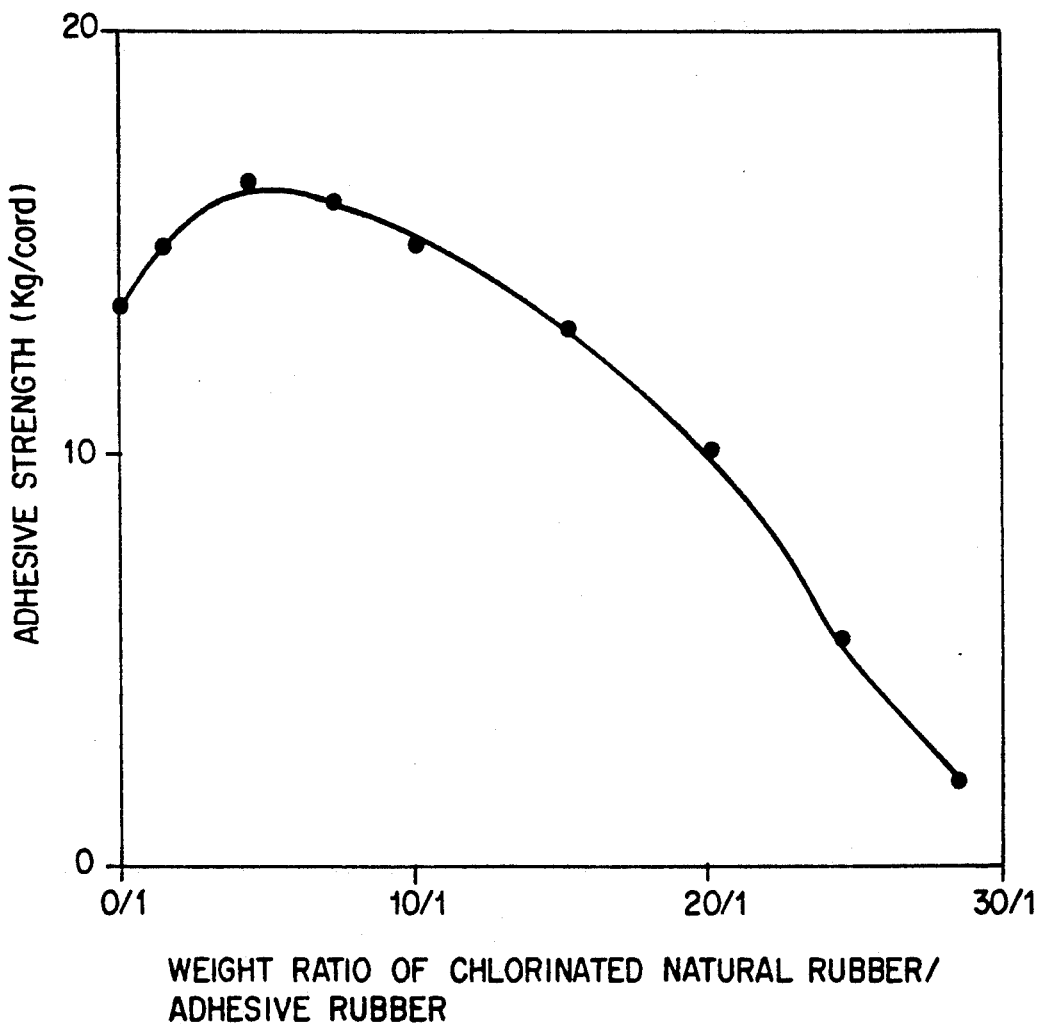

FIG. 5 is a graph which shows the relation between weight ratios of adhesive rubbers/polyisocyanate or polyepoxy compounds and adhesion strength of the resultant adherends; and FIG. 6 is a graph which shows the relation between weight ratios of chlorinated natural rubbers/adhesive rubbers in the adhesive composition used in the second process of the invention and adhesion strength of the resultant adherends.

The first process of the invention will now be described.

The resorcinol/formalin resin used in the first step of the invention is per se already known in the art of adhesion of rubbers and fibers. The resin is initial or low molecular weight condensates which are prepared by condensation of resorcinol and formalin in a molar ratio of resorcinol/formalin in the range from of 1/3 to 3/1 in the presence of a base catalyst. Usually the resin is used as aqueous solutions of 5-80% by weight in solid content when aqueous mixtures of the resin and rubber latices or RFL solutions are prepared.

The polymer which contains halogens in amounts of not less than 45% weight used in the invention is preferably chlorine containing polymers, and includes, for example, polyvinylcholoride, chlorinated rubber, chlorinated polyethylene, poly(dichlorobutadiene), copolymers of dichlorobutadiene with at least one of such comonomers as vinyl acetate, vinylchloride, maleic anhydride, acrylic esters, methacrylic esters, acrylonitrile, vinyl ethers, ethylene, propylene or chloroprene. In particular, polyvinyl choloride, chlorinated rubber or their mixtures are preferred.

In the first step of the process of the invention, the aromatic polyamide fibers are treated with an aqueous mixture composed of the resorcinol/formalin resin and a latex of the polymer which contains halogens in amounts of not less than 45% by weight. The aqueous mixture has a high affinity and wettability to aromatic polyamide fibers on account of high polarity of the halogen containing polymers, but also the mixture forms adhesive layers having large cohesive strength on the fibers.

The use of polymers containing halogens in amounts of less than 45% by weight based on the polymers fails to form such cohesive layers on the fibers, and hence such halogen containing polymers are not suitable for use in the process of the invention. In particular, the use of aqueous mixture containing a latex of polymers which contain halogens in amounts of less than 40% by weight based on the polymer fails to produce strong adhesion between the aromatic polyamide fibers and rubbers.

The aqueous mixture used in the first step of the process contains the halogen containing polymer in amounts preferably of 50-1000 parts by weight, more preferably in amounts of 200-800 parts by weight, in relation to 100 parts by weight of the resorcinol/formalin resin. Further, the solid contents of the aqueous mixture is preferably in the range of 5-80% by weight based on the mixture.

In the first step, the fibers are usually dipped into the aqueous mixture, and then dried, preferably under heating at temperatures, for instance, of about 100°-270° C., for several minutes to fix the mixture on the fibers.

The treatment of the aromatic polyamide fibers only with a latex of the halogen containing polymers fails to provide strong adhesion between the fibers and rubbers. Meanwhile, there is found a tendency that more the halogen content of the halogen containing polymers, the harder the adhesive layers, and the more the amount of the resorcinol/formalin resin and the halogen containing polymers fixed on the fibers, the smaller the resistance to flexing fatigue. Consequently, it is preferred that the halogen content of the halogen containing polymers is not more than 50% by weight based on the polymers. It is further preferred that the amount of the resorcinol/formalin resin and the halogen containing polymers fixed on the fibers is as small as possible from the standpoint as above described. However, when the amount is rendered small, the resultant adhesion strength may undesirably vary.

Thus, in accordance with the invention, the aromatic polyamide fibers are further treated with an aqueous adhesive composition which comprises a resorcinol/formalin resin and a latex of rubber which is compatible to the rubber contained in the rubber compound to which the fibers are to be bonded as the second step of the process of the invention. This second step makes it possible to attain fixed, strong and durable adhesion between the fibers and rubbers without deterioration of resistance to flexing fatigue even when small amounts of the aqueous mixture are fixed on the fibers in the first step.

The resorcinol/formalin resin used in the second step may be the same as or different from that used in the first step.

As the aforesaid adhesive rubber which is compatible to the rubber in the rubber compound, there may be used usually the same unvulcanized rubber as the rubber species in the rubber compound or unvulcanized rubbers which have chemical structures similar to the rubber species in the rubber compound. However, rubber species which are different in chemical structures from the rubber species in the rubber compound may be used as an adhesive rubber provided that the adhesive rubber is close to the rubber species in polarity or more specifically in solubility parameter, since such adhesive rubbers are compatible to the substrate rubber species in the rubber compounds. The adhesive composition usually contains suitable vulcanizing agent depending upon the adhesive rubber used.

A variety of methods are known to calculate the solubility parameters, among which is representative a Small's method which is described in detail in J. Paint Technol., 42, 76 (1970) under the title of New Values of the Solubility Parameters from Vapor Pressure Data. In the invention, there may be preferably used, as an adhesive rubber, such a rubber as has a solubility parameter in the range of from the solubility parameter of the rubber in the rubber compound plus one to the solubility parameter of the rubber in the rubber compound minus one. The use of rubber species of solubility parameters outside the above specified range as an adhesive rubber fails to produce strong adhesion between the fibers and the rubbers since the adhesive rubber is too far from the substrate rubber species in the rubber compound in the polarity, and therefore very poorly adhesive thereto.

The adhesive composition used preferably contains the adhesive rubber in amounts of 50–1000 parts by weight, more preferably of 200–800 parts by weight, in relation to 100 parts by weight of the resorcinol/formalin resin in the adhesive composition. It is further preferred that the adhesive composition contains solids in amounts of 5–80% by weight.

In the second step, the fibers are usually dipped into the aqueous adhesive composition, and then dried, preferably under heating at temperatures, for instance, of about 100°–270° C., for several minutes to fix the composition on the fibers.

In the process of the invention, the aromatic polyamide fibers may be pretreated with at least one activating agent selected from the group consisting of polyisocyanate compounds and polyepoxy compounds prior to the first step. The activating agent is usually used in the form of solutions in organic solvents. The fibers are dipped into the solution, and then dried, preferably under heating, for example, at temperatures of about 100°–270° C. so that the activating agent reacts with and is fixed on the fibers.

The solvents used are not specifically limited, but there may be preferably used aromatic hydrocarbons such as benzene, xylene or toluene, aliphatic ketones such as methyl ethyl ketone or methyl isobutyl ketone, alkyl esters of lower aliphatic carboxylic acids, especially acetic acid, such as ethyl acetate or amyl acetate. The content of the activating agent in the activating solution is usually in the range of 10–50% by weight.

The polyisocyanates used are not specifically limited, but preferred examples include tolylenediisocyanate, m-phenylenediisocyanate, diphenylmethane diisocyanate, hexamethylenediisocyanate and polymethylene polyphenyl polyisocyanate. The polyisocyanates may be in the form of adducts with compounds which have not less than two active hydrogens in the molecule such as polyhydric alcohols exemplified by trimethylolpropane or pentaerythritol, or in the form of blocked polyisocyanates which are obtained by the reaction of the polyisocyanates with blocking agents such as phenols, tertiary alcohols or secondary amines.

The polyepoxy compounds used include, for example, reaction products of polyhydric compounds with halogen containing epoxide compounds such as epichlorohydrin. There may be mentioned as such polyhydric compounds, for example, polyhydric alcohols such as ethylene glycol, glycerine, sorbitol or pentaerythritol; polyalkylene glycols such as polyethylene glycol or polypropylene glycol; or polyfunctional phenols such as resorcinol or bis(4-hydroxyphenyl)dimethylethane; or phenol resins such as phenol/formalin resins or resorcinol/formalin resins.

The pretreatment of the fibers as above set forth activates the surfaces of the aromatic polyamide fibers to improve the wettability of the fibers to the aqueous mixture of resorcinol/formalin resin and the halogen containing polymers applied to the fibers in the first step. Further, the activating agent fixed on the fibers reacts with methylol groups of the resorcinol/formalin resin applied to the fibers in the first step, or is resinated during the vulcanization of the rubber together with the fibers, thereby to form strong and durable adhesion between the fibers and the rubbers.

The fibers are finally placed in close contact with rubber compounds or mixes in the third step, and the rubber compounds are vulcanized together with the fibers in conventional manners known in the rubbers used.

The process of the invention is not specifically limited to rubbers to which the aromatic polyamide fibers are bonded, but is suitably applicable to such rubbers as natural rubber, styrene/butadiene rubber, chloroprene rubber, acrylonitrile/butadiene rubber, ethylene/propylene rubber, chlorinated polyethylene rubber, chlorosulfonated polyethylene rubber, epichlorohydrin rubber or fluorocarbon rubber. The process is most suitably applied to adhesion of the aromatic polyamide fibers to natural rubber, styrene/butadiene rubber, chloroprene rubber or acrylonitrile/butadiene rubber, however.

The rubber compounds used may of course contain known rubber chemicals or additives depending upon the individual rubbers used. There may be mentioned as such chemicals or additives, for example, reinforcing fillers including carbon black or silica, softening agents, antioxidants, plasticizers, vucanization accelerators, processing aids and the like.

The second process of the invention for bonding aromatic polyamide fibers to rubbers will now be described.

In the second process of the invention, the first step and the third step are the same as in the first process of the invention, so that no more description is given herein with respect thereto.

The second process in accordance with the invention is different from the first process in the second step. In the second step in the second process, the aromatic polyamide fibers are treated with an adhesive composition comprising at least one activating agent selected from the group consisting of polyisocyanate compounds and polyepoxy compounds in amounts of 10–90 parts by weight, preferably of 20–80 parts by weight, and an adhesive rubber which is compatible with the rubber in the rubber compounds in amounts of 90–10 parts by weight, preferably of 80–20 parts by weight.

The second step of the second process is carried out for the same reason as in the second of the first process of the invention.

The same polyisocyanate or polyepoxy compounds as those hereinbefore mentioned may be used as the activating agent in the second step of the second process. The activating agent used here is resinated during the vulcanization of the rubber compounds with the fibers, thereby to improve cohesion of the adhesive layers formed, but also to form strong adhesive layers by the reaction of methylol groups in the resorcinol/formalin resin used. Also the same adhesive rubber as those described before may be used, taking the closeness of the solubility parameters of the rubbers used.

The adhesive composition is used usually in the form of solutions in such organic solvents as mentioned hereinbefore. It is preferred that the adhesive composition contains solids in amounts of 10-50% by weight.

When a rubber which contains no halogens therein such as natural rubber, styrene/butadiene rubber or acrylonitrile/butadiene rubber is used a first adhesive rubber, it is preferred that the adhesive composition further contains chlorinated natural rubber as a second adhesive rubber in amounts of 10-1000 parts by weight in relation to 100 parts by weight of the first adhesive rubber used in the composition. The incorporation of the chlorinated natural rubber into the adhesive composition as an additional adhesive rubber improves the compatibility of the adhesive composition to the mixture of the resorcinol/formalin resin and the halogen containing polymers, and raises cohesion of the resultant adhesive layers, thereby to successfully produce very strong and durable adhesion between the fibers and rubbers.

In the second step of the second process of the invention, the fibers are usually dipped into the solvent base adhesive composition, and then dried, preferably under heating at temperatures, for instance, of about 100°-270° C., for several minutes to fix the composition on the fibers.

In the second process of the invention, too, the fibers may be pretreated with polyisocyanates or polyepoxy compounds in the same manner as hereinbefore described prior to the first step.

The processes of the invention thus provide aromatic polyamide fibers-rubber adherend composites which have strong and durable adhesion therebetween, and the processes of the invention are suitably employed in the production of dynamic rubber products such as automobile tires, transmission belts or conveyor belts.

The invention will now be described with reference to examples, however, the invention is not limited to the examples. In the examples, parts and percents are by weight unless otherwise specified.

In the examples, the following rubbers and latices were used.

Polyvinyl chloride latex (PVC latex):

Zeon 150×50 (Nippon Zeon K.K.) having a solid content of 48% by weight. The polyvinyl chloride had a chlorine content of 57% by weight and a solubility parameter of 9.7. Chlorinated rubber latex:

An amount of 30 parts by weight of chlorinated rubber CR-150 (Asahi Denka K.K.) having a chlorine content of 65% by weight and a solubility parameter of 9.5 was added to 60 parts by weight of toluene. The resultant solution was added to a mixture of 100 parts by weight of water and 1.4 parts by weight of an emulsifier, followed by stirring with a homomixer, to provide a latex having a solid content of 20% by weight.

Chloroprene rubber latex:

LV-60 (Denki Kagaku Kogyo K.K.) having a solid content of 50% by weight. The chloroprene had a chlorine content of 41% by weight and a solubility parameter of 9.2. Chlorosulfonated polyethylene rubber latex:

Chlorosulfonated polyethylene rubber latex (Sumitomo Seika K.K.) having a solid content of 40% by weight. The chlorosulfonated polyethylene had a chlorine content of 25% by weight and a solubility parameter of 9.1.

Natural rubber latex:

The latex of a solid content of 60% by weight and a solubility parameter of 8.3.

Styrene/butadiene rubber latex (SBR latex):

Nipol LX 110 (Nippon Zeon K.K.) having a solid content of 40% by weight.

Acrylonitrile/butadiene rubber (Nitrile rubber):

Nipol 1043 (Nippon Zeon K.K.) having a solubility paramers of 9.7.

Chloroprene rubber:

Neoprene WRT (Showa Denko K.K.) having a solubility parameter of 9.2.

Polyisocyanate:

Millionate MR (polymethylene polyphenyl polyisocyanate, Nippon Polyurethane Kogyo K.K.) or PAPI (Kasei Upjohn K.K.)

Polyepoxy compound:

Denacol EX 313 (glycerol polyglycidyl ether, Nagase Kasei Kogyo K.K.)

Chlorinated natural rubber:

CR-150 (Asahi Denka K.K.) having a chlorine content of 65% by weight and a solubility parameter of 9.5.

The abbreviations of adhesion failure stand for the followings.

F: Fibers failure
F-A: Interface failure between fibers and adhesive
A: Adhesive failure
A-R: Interface failure between adhesive and rubber
R: Rubber cohesive failure

EXAMPLE 1

Aromatic polyamide fiber cords ("Technola" by Teijin K.K., 1500d/1×3) were dipped into an aqueous mixture (a) as shown in the Table 1, and then dried at 200° C. for two minutes.

Then, in the Example A and Comparative C, as shown in the Table 1, the cords were dipped into an aqueous mixture (b) of which ingredients are shown in the Table 1, and dried at 200° C. for two minutes.

The thus treated fiber cords were placed in close contact with a rubber compound 1 shown below, and the rubber compound was vulcanized at 150° C. for 30 minutes.

In the Comparative Examples B and D, the fiber cords were treated with the aqueous mixture (a), but not with the aqueous mixture (b), and vulcanized with the rubber compound 1.

| Unvalcunized Rubber Compound 1 | (parts by weight) |
|---|---|
| Natural rubber | 100 |
| Zinc oxide | 5 |
| Stearic acid | 2 |
| Sulfur | 2.5 |
| FEF carbon black | 45 |
| Process oil | 5 |
| N-hydroxydiethylene-2-benzothiazyl sulfenamide | 1 |
| 2,2,4-trimethyl-1,2-dihydroquinoline | 0.2 |

The resultant adherends were subjected to measurement of 180° peeling adhesion strength between the fiber cords and the rubber at a peeling rate of 100 mm per minute by an adhesion test. The results are shown in the Table 1.

TABLE 1

|  | Example | Comparative | | |
|---|---|---|---|---|
|  | A | B | C | D |
| Aqueous Mixture (a) | | | | |
| Resorcinol | 5.0 | 5.0 | 5.0 | 5.0 |
| Formalin | 3.1 | 3.1 | 3.1 | 3.1 |
| PVC latex | 61.6 | 61.6 | — | — |
| Natural rubber latex | — | — | 61.6 | 61.6 |
| Water | 84.3 | 84.3 | 84.3 | 84.3 |
| Aqueous Mixture (b) | | | | |
| Resorcinol | 5.0 | — | 5.0 | — |
| Formalin | 3.1 | — | 3.1 | — |
| Natural rubber latex | 61.6 | — | 61.6 | — |
| Water | 84.3 | — | 84.3 | — |
| Adhesion Strength (Kg/cord) | 13.1 | 2.7 | 3.5 | 5.1 |
| Adhesion Failure | R | A-R | F-A | F-A |

EXAMPLE 2

The same aromatic polyamide fiber cords as in the Example 1 were dipped into an aqueous mixture (a) as shown in the Table 2, and then dried at 200° C. for two minutes. The fiber cords were then dipped in the same aqueous mixture (b) as in the Example A, and dried at 200° C. for two minutes.

The fiber cords were then placed in close contact with the same rubber compound as in the Example 1, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 2.

Figure 1:
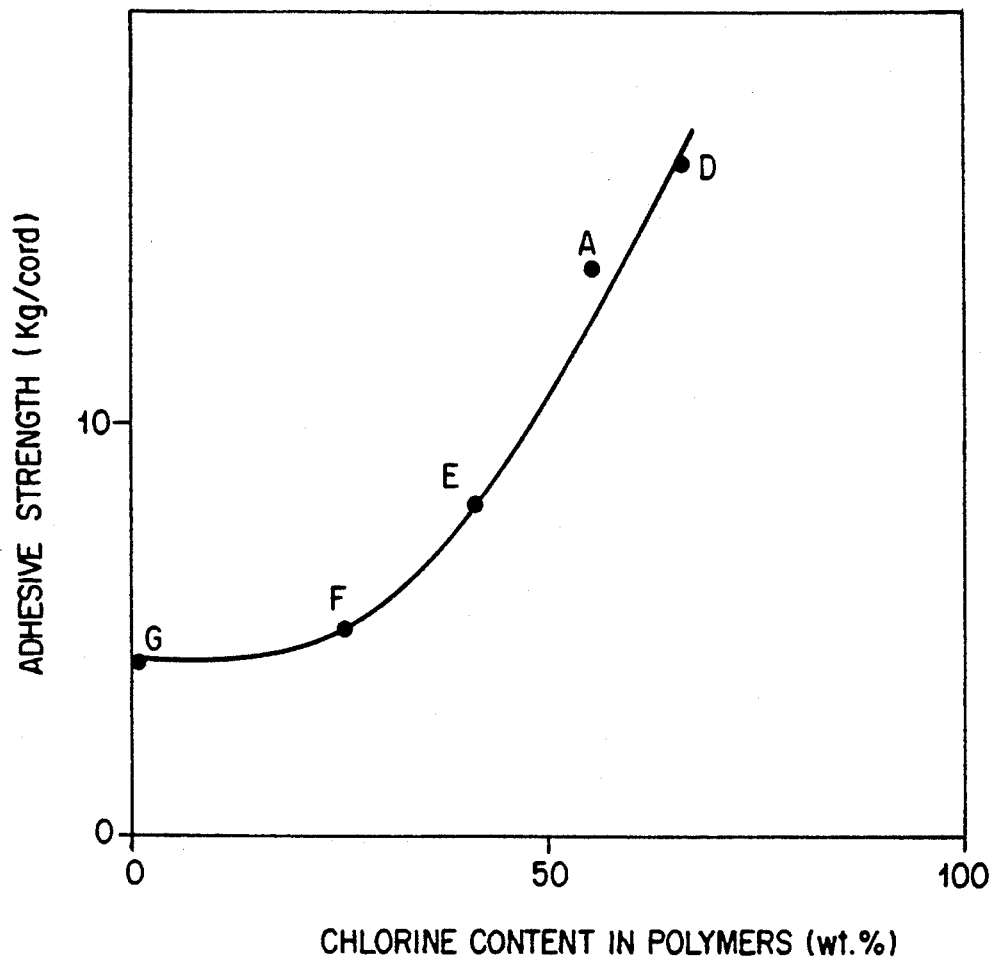
FIG. 1 is a graph which shows the relation between chlorine contents of polymers in the adhesive compositions used in accordance with the first process of the invention and adhesion strength of the resultant adherends of natural rubber compounds and aromatic polyamide fiber cords.

Based on the results of the Examples A and E, and the Comparative Examples C, F and G, the relation between the chlorine contents of the polymers in the aqueous mixture (a) and the peeling adhesion strength in the resultant adherends is illustrated in FIG. 1.

As apparent, when the aromatic polyamide fiber cords are first treated with an aqueous mixture or an RFL solution containing a polyvinyl chloride latex or a chlorinated rubber latex, and then with an adhesive composition containing natural rubber, followed by vulcanizing with a rubber compound, an adherend is obtained which has a strong adhesion between the fiber cords and the rubber.

TABLE 2

|  | Example | | Comparative | | |
|---|---|---|---|---|---|
|  | A | E | F | G | C |
| Aqueous Mixture (a) | | | | | |
| Resorcinol | 5.0 | 5.0 | 5.0 | 5.0 | 5.0 |
| Formalin | 3.1 | 3.1 | 3.1 | 3.1 | 3.1 |
| PVC latex | 61.6 | — | — | — | — |
| Chlorinated rubber latex | — | 61.6 | — | — | — |
| Chloroprene rubber latex | — | — | 61.6 | — | — |
| Chlorosulfonated polyethylene latex | — | — | — | 61.6 | — |
| Natural rubber latex | — | — | — | — | 61.6 |
| Water | 84.3 | 84.3 | 84.3 | 84.3 | 84.3 |
| Adhesion Strength (Kg/cord) | 13.1 | 15.3 | 7.6 | 4.4 | 3.5 |
| Adhesion Failure | R | R | R/F-A | F-A | F-A |

EXAMPLE 3

The same aromatic polyamide fiber cords as in the Example 1 were dipped into an aqueous mixture (a) as shown in the Table 3, and then dried at 200° C. for two minutes. The fiber cords were then dipped in an aqueous mixture (b) as shown in the Table 3, and dried at 200° C. for two minutes.

The fiber cords were then placed in close contact with the aforesaid rubber compound 1, or rubber compounds 2 or 3 as shown below, and the rubber compounds were vulcanized at 150° C. for 30 minutes.

| Unvalcunized Rubber Compound 2 | (parts by weight) |
|---|---|
| Neoprene WRT | 100 |
| Magnesium oxide | 4 |
| Zinc oxide | 5 |
| SFR carbon black | 40 |
| 2-mercaptoimidazoline | 0.5 |
| N,N'-di-$\beta$-naphthyl-p-phenylenediamine | 0.5 |
| 2,2,4-trimethyl-1,2-dihydroquinoline | 0.5 |
| Process oil | 10 |
| Stearic acid | 0.5 |

| Unvalcunized Rubber Compound 3 | (parts by weight) |
|---|---|
| Nitrile rubber | 100 |
| Zinc oxide No. 1 | 5 |
| Stearic acid | 1 |
| Sulfur | 0.5 |
| SFR carbon black | 40 |
| Tetramethylthiuram disulfide | 2 |
| Mercaptobenzothiazol | 0.5 |

The resultant adherends were subjected to measurement of 180° peeling adhesion strength between the fiber cords and the rubber at a peeling rate of 100 mm per minute by an adhesion test. The results are shown in the Table 3.

TABLE 3

|  | Example | | | |
|---|---|---|---|---|
|  | A | H | I | J |
| Aqueous Mixture (a) | | | | |
| Resorcinol | 5.0 | 5.0 | 5.0 | 5.0 |
| Formalin | 3.1 | 3.1 | 3.1 | 3.1 |
| PVC latex | 61.6 | 61.6 | 61.6 | 61.6 |
| Water | 84.3 | 84.3 | 84.3 | 84.3 |
| Aqueous Mixture (b) | | | | |
| Resorcinol | 5.0 | 5.0 | 5.0 | 5.0 |
| Formalin | 3.1 | 3.1 | 3.1 | 3.1 |
| Natural rubber latex | 61.6 | — | — | — |
| SBR latex | — | 61.6 | — | — |
| Chloroprene rubber latex | — | — | 61.6 | — |
| Nitrile rubber latex | — | — | — | 61.6 |
| Water | 84.3 | 84.3 | 84.3 | 84.3 |
| Unvulcanized Rubber Compound 1 | | | | |
| Adhesion Strength (Kg/cord) | 13.1 | 12.8 | 10.7 | 2.3 |
| Adhesion Failure | R | R | R*) | A-R |
| Unvulcanized Rubber Compound 2 | | | | |
| Adhesion Strength (Kg/cord) | 10.7 | 12.3 | 13.8 | 11.5 |
| Adhesion Failure | R*) | R*) | R | R |
| Unvulcanized Rubber Compound 3 | | | | |
| Adhesion Strength (Kg/cord) | 1.9 | 9.8 | 13.2 | 14.8 |
| Adhesion Failure | A-R | R*) | R | R |

Figure 2:
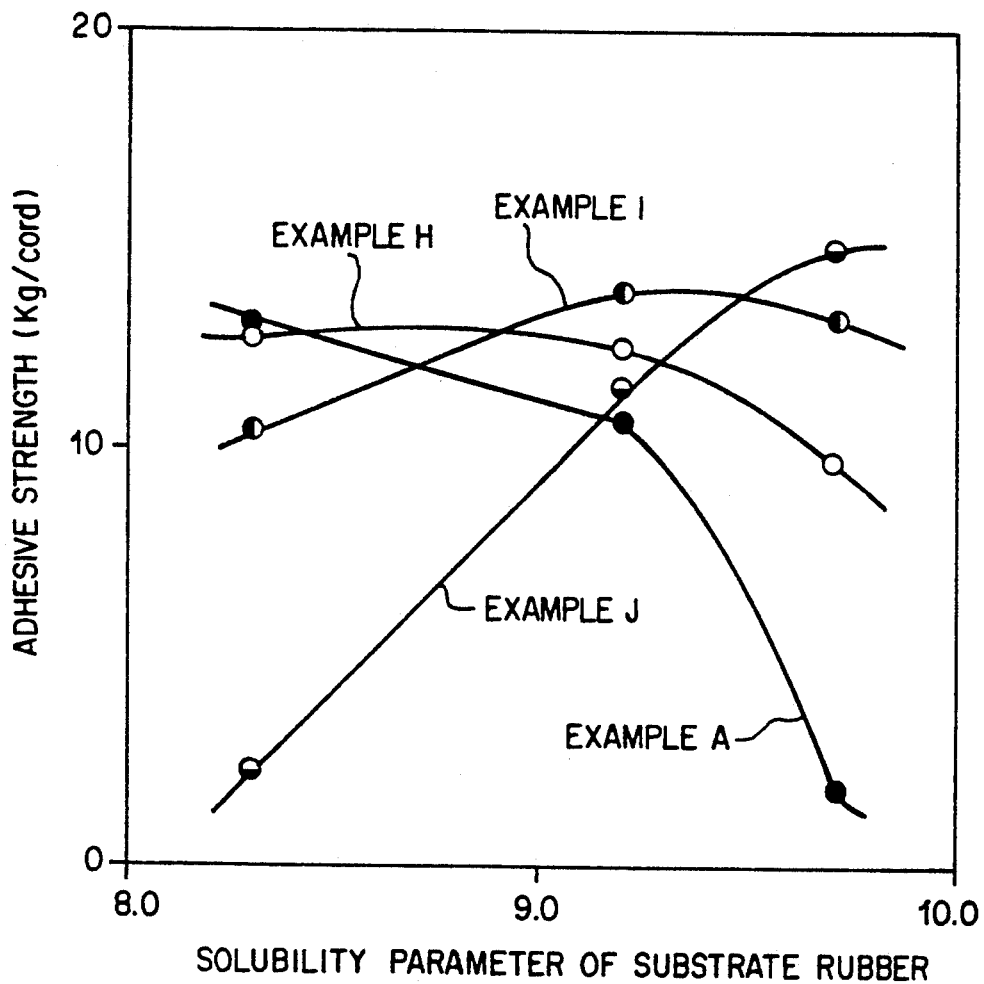
FIG. 2 is a graph which shows the relation between solubility parameters of substrate rubbers and adhesion strength between fiber cords and the substrate rubbers.

Notes:
*)A-R was observed in part.:

Based on the results with the adherends which were obtained in the Examples A, H, I and J using adhesive compositions which contained natural rubber or nitrile rubber, the relation between the solubility parameters of the substrate rubber or the rubber in the rubber compounds and adhesion strength between the fiber cords and the rubbers is illustrated in FIG. 2.

In the Example A, the fiber cords were treated with an aqueous mixture (a) and then with an adhesive composition (b) which contained natural rubber having a solubility parameter of 8.3. Thus, the compound 1 of natural rubber is bonded strongly to the fiber cords. Similarly, since natural rubber has a solubility parameter close to that of chloroprene rubber, the difference therebetween being 0.9, the chloroprene rubber compound 2 is firmly bonded to the fiber cords.

On the contrary, nitrile rubber has a solubility parameter of 9.7, more than that of the natural rubber as an adhesive rubber by 1.4, so that no strong adhesion is obtained between the nitrile rubber compound 3 and the fiber cords.

In the Example J, the fiber cords were treated with an adhesive composition containing a latex of nitrile rubber having a solubility parameter of 9.7, while natural rubber has a solubility parameter of 8.3, the difference therebetween being 1.4. Therefore, no strong adhesion was attained between the natural rubber compound 1 and the fiber cords.

However, chloroprene rubber has a solubility parameter of 9.2, close to that of the nitrile rubber, so that there is obtained strong adhesion between the chloroprene rubber compound 2 and the fiber cords. Of course, the nitrile rubber compound 3 is firmly bonded to the fiber cords.

In the Example H, a latex of styrene/butadiene rubber having a solubility parameter of 8.8 is used as an adhesive rubber, and in the Example I, a latex of chloroprene rubber having a solubility parameter of 9.2 is used as an adhesive rubber. These adhesive rubbers have solubility parameters which are the same as or close to those of rubbers in either compounds 1, 2 or 3. Accordingly, the fiber cords treated with adhesive compositions which contain either styrene/butadiene rubber latex or chloroprene rubber latex are strongly bonded to either natural rubber compounds, chloroprene rubber compounds or nitrile rubber compounds.

EXAMPLE 4

The same aromatic polyamide fiber cords as in the Example 1 were dipped into an aqueous mixture (a) as shown in the Table 4, and then dried at 200° C. for two minutes. The fiber cords were then dipped in an aqueous mixture (b) as shown in the Table 4, and dried at 200° C. for two minutes.

The fiber cords were then placed in close contact with the nitrile rubber compound 3, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 4.

The adherends were fixed at their one ends to a frame, and then travelled along a pair of rotational bars, with the other ends connected to a load of 1.5 kg. Then the bars were moved up and down in the opposite directions 100000 times while rotating in such a manner that the distance between the rotational axes of the bars oscillatorily changed, thereby to estimate the tensile strength retention which is defined by tensile strength after the flexing test divided tensile strength before the test. The results are shown in the Table 4.

TABLE 4

|  | Example J | Comparative K |
| --- | --- | --- |
| Aqueous Mixture (a) | | |
| Resorcinol | 5.0 | 5.0 |
| Formalin | 3.1 | 3.1 |
| PVC latex | 61.6 | 61.6 |
| Water | 84.3 | 84.3 |
| Aqueous Mixture (b) | | |
| Resorcinol | 5.0 | 5.0 |
| Formalin | 3.1 | 3.1 |
| Nitrile rubber latex | 61.6 | — |
| PVC latex | — | 61.6 |
| Water | 84.3 | 84.3 |
| Adhesion Strength (Kg/cord) | 14.8 | 13.7 |
| Adhesion Failure | R | R |
| Tensile Strength (Kg/cord) | | |
| Before Test | 207 | 204 |
| After Test | 191 | 34 |
| Retention (%) | 92.1 | 16.7 |

EXAMPLE 5

The same aromatic polyamide fiber cords as in the Example 1 were dipped into an aqueous mixture (c) as shown in the Table 5, and then dried at 200° C. for two minutes. The fiber cords were then dipped in an aqueous mixtures (a) and (b) in succession in the same manner as in the Example A, and dried at 200° C. for two minutes.

The fiber cords were then placed in close contact with the rubber compound 1, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 5.

TABLE 5

|  | Example X | Comparative Y | Comparative Z |
| --- | --- | --- | --- |
| Aqueous Mixture (c) | | | |
| PAPI | 9.0 | — | 4.5 |
| Polyepoxy compound | — | 9.0 | 4.5 |
| 10% NaOH solution | — | 1.0 | 0.5 |
| Toluene | 141 | 140 | 140.5 |
| Adhesion Strength (Kg/cord) | 13.2 | 12.8 | 11.5 |
| Adhesion Failure | R | R | R |

EXAMPLE 6

The same aromatic polyamide fiber cords were dipped into an aqueous mixture (a) as shown in the Table 6, and then dried at 200° C. for two minutes.

Then, in the Example A and Comparative C, as shown in the Table 1, the cords were dipped into an aqueous mixture (b) of which ingredients are shown in the Table 1, and dried at 200° C. for two minutes.

The thus treated fiber cords were placed in close contact with the aforesaid natural rubber compound 1, and the rubber compound was vulcanized at 150° C. for 30 minutes.

In the Comparative Example B, the fiber cords were treated with the aqueous mixture (a), but not with the aqueous mixture (b), and vulcanized with the rubber compound 1.

The resultant adherends were subjected to measurement of 180° peeling adhesion strength between the fiber cords and the rubber at a peeling rate of 100 mm per minute by an adhesion test. The results are shown in the Table 6.

TABLE 6

|  | Example A | Comparative B | Comparative C |
|---|---|---|---|
| Aqueous Mixture (a) | | | |
| Resorcinol | 5.0 | 5.0 | 5.0 |
| Formalin | 3.1 | 3.1 | 3.1 |
| PVC latex | 61.6 | 61.6 | — |
| Natural rubber latex | — | — | 61.6 |
| Water | 84.3 | 84.3 | 84.3 |
| Aqueous Mixture (b) | | | |
| Resorcinol | 7.0 | — | 7.0 |
| Millionate MR | 7.0 | — | — |
| Carbon black | 3.0 | — | 3.0 |
| Toluene | 83.0 | — | 83.0 |
| Adhesion Strength (Kg/cord) | 13.7 | 2.7 | 5.1 |
| Adhesion Failure | R | A-R | F-A |

EXAMPLE 7

The same aromatic polyamide fiber cords as in the Example 1 were dipped into an aqueous mixture (a) as shown in the Table 7, and then dried at 200° C. for two minutes. The fiber cords were then dippied in the same aqueous mixture (a) as in the Example A in the Table 6, and dried at 200° C. for two minutes.

The fiber cords were then placed in close contact with the natural rubber compound 1, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 7.

Figure 3:
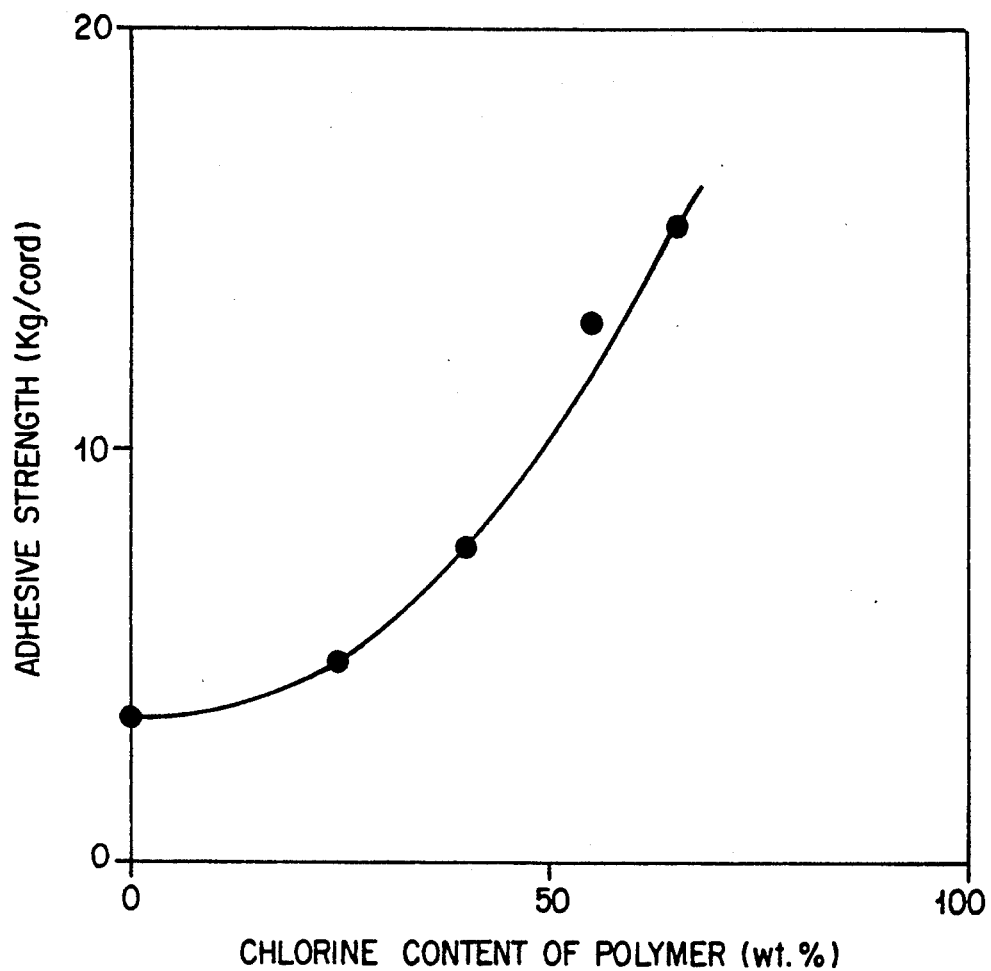
FIG. 3 is a graph which shows the relation between chlorine contents of polymers in the adhesive compositions used in accordance with the second process of the invention and adhesion strength of the resultant adherends of natural rubber compounds and aromatic polyamide fiber cords.

Based on the results of the Examples A and D, and the Comparative Examples E, F and G, the relation between the chlorine contents of the polymers in the aqueous mixture (a) and the peeling adhesion strength in the resultant adherends is illustrated in FIG. 3.

As apparent, when the aromatic polyamide fiber cords are first treated with an aqueous mixture or an RFL solution containing a polyvinyl chloride latex or a chlorinated rubber latex, and then with an adhesive composition containing natural rubber as an adhesive rubber and a polyisocyanate as an activating agent, followed by vulcanizing with a rubber compound, to provide a natural rubber-fiber cords composite having strong adhesion therebetween.

TABLE 7

|  | Example D | Comparative E | Comparative F | Comparative G |
|---|---|---|---|---|
| Aqueous Mixture (a) | | | | |
| Resorcinol | 5.0 | 5.0 | 5.0 | 5.0 |
| Formalin | 3.1 | 3.1 | 3.1 | 3.1 |
| Chlorinated rubber latex | 61.6 | — | — | — |
| Chloroprene rubber latex | — | 61.6 | — | — |
| Chlorosulfonated polyethylene latex | — | — | 61.6 | — |
| Natural rubber latex | — | — | — | 61.6 |
| Water | 84.3 | 84.3 | 84.3 | 84.3 |
| Adhesion Strength (Kg/cord) | 16.2 | 8.3 | 5.1 | 4.4 |
| Adhesion Failure | R | R/F-A | F-A | F-A |

EXAMPLE 8

The same aromatic polyamide fiber cords as in the Example 1 were dipped into an aqueous mixture (a) as shown in the Table 8, and then dried at 200° C. for two minutes. The fiber cords were then dippied in an aqueous mixture (b) as shown in the Table 8, and dried at 200° C. for two minutes.

The fiber cords were then placed in close contact with the natural rubber compound 1, chloroprene rubber compound 2 or nitrile rubber compound 3 as hereinbefore described, and the rubber compounds were vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 8.

TABLE 8

|  | Example A | Example H |
|---|---|---|
| Aqueous Mixture (a) | | |
| Resorcinol | 5.0 | 5.0 |
| Formalin | 3.1 | 3.1 |
| PVC latex | 61.6 | 61.6 |
| Water | 84.3 | 84.3 |
| Aqueous Mixture (b) | | |
| Resorcinol | 7.0 | — |
| Nitrile rubber | — | 7.0 |
| Millionate MR | 7.0 | 7.0 |
| Carbon black | 3.0 | 3.0 |
| Toluene | 83.0 | 83.0 |
| Unvulcanized Rubber Compound 1 | | |
| Adhesion Strength (Kg/cord) | 13.7 | 2.5 |
| Adhesion Failure | R | A-R |
| Unvulcanized Rubber Compound 2 | | |
| Adhesion Strength (Kg/cord) | 10.4 | 12.3 |
| Adhesion Failure | R*) | R |
| Unvulcanized Rubber Compound 3 | | |
| Adhesion Strength (Kg/cord) | 2.3 | 15.3 |
| Adhesion Failure | A-R | R |

Figure 4:
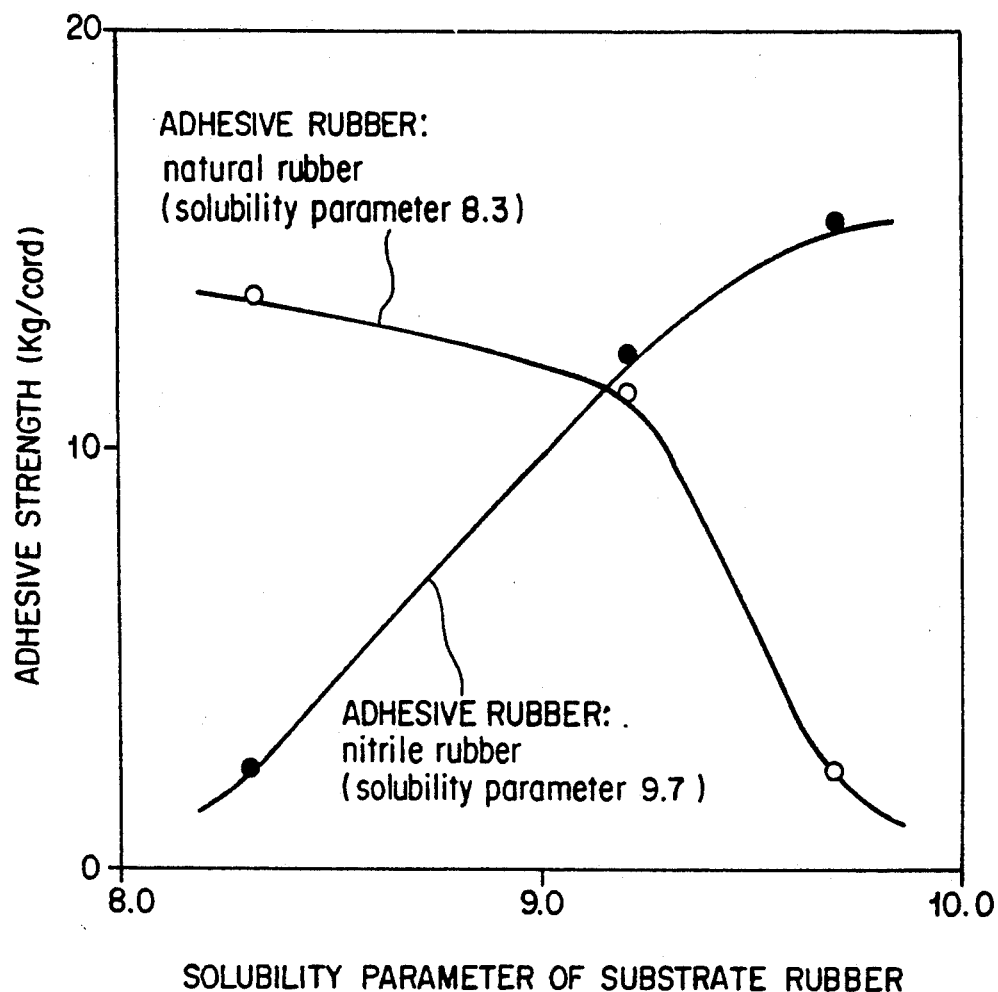
FIG. 4 is a further graph which shows the relation between solubility parameters of substrate rubbers and adhesion strength between fiber cords and the substrate rubbers.

Notes:
*)A-R was observed in part.:

Based on the results with the adherends which were obtained in the Examples A and H using adhesive compositions which contained natural rubber or nitrile rubber, the relation between the solubility parameters of the substrate rubber or the rubber in the rubber compounds and adhesion strength between the fiber cords and the rubbers is illustrated in FIG. 4.

In the Example A, the fiber cords were treated with an aqueous mixture (a) and then with an adhesive composition (b) which contained natural rubber having a solubility parameter of 8.3. Thus, the compound 1 of natural rubber is bonded strongly to the fiber cords. Similarly, since natural rubber has a solubility parameter close to that of chloroprene rubber, the difference therebetween being 0.9, the chloroprene rubber compound 2 is firmly bonded to the fiber cords.

On the contrary, nitrile rubber has a solubility parameter of 9.7, more than that of the natural rubber as an adhesive rubber by 1.4, so that no strong adhesion is obtained between the nitrile rubber compound 3 and the fiber cords.

In the Example H, the fiber cords were treated with an adhesive composition containing a nitrile rubber having a solubility parameter of 9.7, while natural rubber has a solubility parameter of 8.3, the difference therebetween being 1.4. Therefore, no strong adhesion was attained between the natural rubber compound 1 and the fiber cords.

However, chloroprene rubber has a solubility parameter of 9.2, close to that of the nitrile rubber, so that there is obtained strong adhesion between the chloroprene rubber compound 2 and the fiber cords. Of course, the nitrile rubber compound 3 is firmly bonded to the fiber cords.

EXAMPLE 9

The same aromatic polyamide fiber cords as in the Example 1 were dipped into an aqueous mixture (a) as shown in the Table 9, and then dried at 200° C. for two minutes. The fiber cords were then dippied in an aqueous mixture (b) as shown in the Table 9, and dried at 200° C. for two minutes.

The fiber cords were then placed in close contact with the natural rubber compound 1, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 9.

Further, the fiber cords were treated with adhesive compositions (b) having varied weight ratios of the adhesive rubbers/polyisocyanate or polyepoxy compounds used, and otherwise in the same manner as above, and the fiber cords were vulcanized with the natural rubber compound 1.

FIG. 5 illustrates the relation between the weight ratios of adhesive rubbers/polyisocyanate or polyepoxy compounds and the adhesion strength of the resultant adherends.

TABLE 9

|  | Example | |
|---|---|---|
|  | A | I |
| Aqueous Mixture (a) | | |
| Resorcinol | 5.0 | 5.0 |
| Formalin | 3.1 | 3.1 |
| PVC latex | 61.6 | 61.6 |
| Water | 84.3 | 84.3 |
| Adhesive Composition (b) | | |
| Natural rubber | 7.0 | 7.0 |
| Millionate MR | 7.0 | — |
| Polyepoxy compound | — | 7.0 |
| Carbon black | 3.0 | 3.0 |
| Toluene | 83.0 | 83.0 |
| Adhesion Strength (Kg/cord) | 13.7 | 13.1 |
| Adhesion Failure | R | R |

EXAMPLE 10

The same aromatic polyamide fiber cords as in the Example 1 were dipped into an aqueous mixture (a) as shown in the Example A in the Table 6, and then dried at 200° C. for two minutes. The fiber cords were then dippied in adhesive compositions (b) containing chlorinated natural rubber in varied amounts in relation to natural rubber, and dried at 200° C. for two minutes.

The fiber cords were then placed in close contact with the natural rubber compound 1, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in FIG. 6.

EXAMPLE 11

The same aromatic polyamide fiber cords as in the Example 1 were dipped into an activation solution (c) as shown in the Table 10, and then dried at 200° C. for two minutes. The fiber cords were then treated in the same manner as in the Example A of the Example 6 with the aqueous solution (a) and the adhesive composition (b) in succession.

The fiber cords were then placed in close contact with the natural rubber compound 1, and the rubber compound was vulcanized at 150° C. for 30 minutes.

The resultant adherends were subjected to measurement of 180° peeling adhesion strength between the fiber cords and the rubber at a peeling rate of 100 mm per minute by an adhesion test. The results are shown in the Table 10.

TABLE 10

|  | Example | Comparative | |
|---|---|---|---|
|  | X | Y | Z |
| Adhesive Composition | | | |
| PAPI | 9.0 | — | 4.5 |
| Polyepoxy compound | — | 9.0 | 4.5 |
| 10% NaOH solution | — | 1.0 | 0.5 |
| Toluene | 141 | 140 | 140.5 |
| Adhesion Strength (Kg/cord) | 13.7 | 14.7 | 13.1 |
| Adhesion Failure | R | R | R |

What is claimed is:

1. A process of bonding aromatic polyamide fibers to rubber compounds wherein the rubber is selected from the group consisting of natural rubber, styrene/butadiene rubber, acrylonitrile/butadiene rubber, ethylene/propylene rubber, epichlorohydrin rubber and fluorocarbon rubber, which comprises: a first step of treating fibers with an aqueous mixture consisting essentially of a resorcinol/formalin resin and a latex of a polymer selected from the group consisting of polyvinyl chloride, chlorinated rubber, chlorinated polyethylene, poly(dichlorobutadiene) and a copolymer of dichlorobutadiene and containing chlorine in amounts of not less than 45% by weight based on the polymer; the polymer being contained in the aqueous mixture in amounts of 50-1000 parts by weight in relation to 100 parts by weight of the resorcinol/formalin resin; a second step of treating the fibers with an aqueous adhesive composition consisting essentially of a resorcinol/formalin resin and a latex of an adhesive rubber which is the same as the rubber in the rubber compounds; the adhesive rubber being contained in the aqueous adhesive composition in amounts of 50-1000 parts by weight in relation to 100 parts by weight of the resorcinol/formalin resin; and a third step of placing the fibers in close contact with the rubber compound and then vulcanizing the rubber together with the fibers.

2. The process as claimed in claim 1 wherein the aqueous mixture contains 5-80% by weight of solid contents.

3. The process as claimed in claim 1 wherein the adhesive composition contains solids in amounts of 5-80% by weight.

4. The process as claimed in claim 1 wherein the fibers are pretreated with at least one activating agent selected from the group consisting of polyisoyanates and polyepoxy compounds.

* * * * *